Nov. 10, 1964   J. GODEFROY   3,156,045
DRY SHAVER WITH RECIPROCATING INNER CUTTER
AND COMPOUND OSCILLATING OUTER SHEAR PLATE
Filed Oct. 9, 1961   3 Sheets-Sheet 1
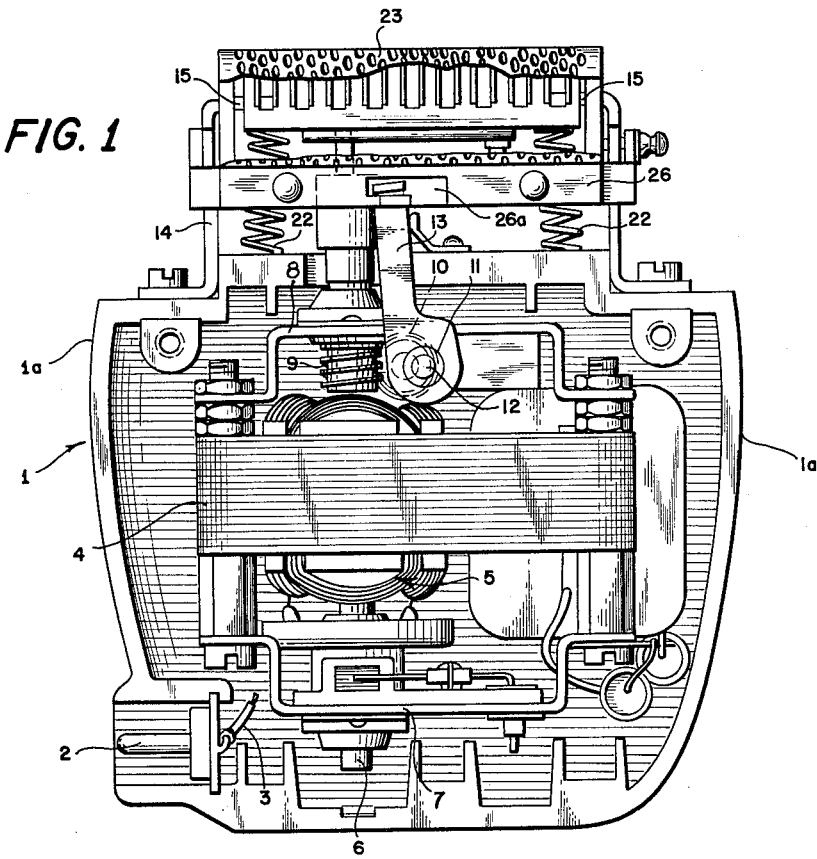
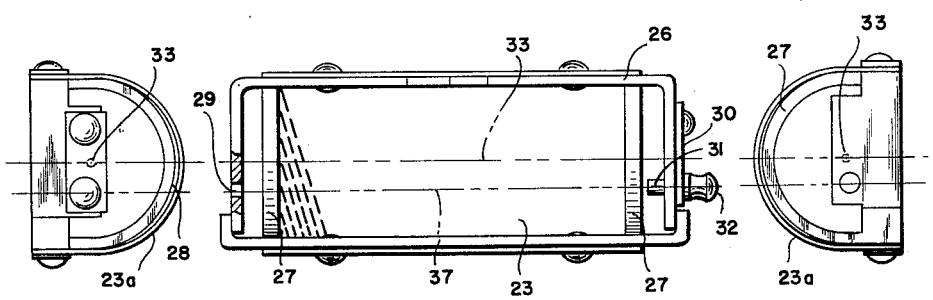
INVENTOR
JOHAN GODEFROY
BY Semmes & Semmes
ATTORNEYS Nov. 10, 1964                J. GODEFROY                    3,156,045
              DRY SHAVER WITH RECIPROCATING INNER CUTTER
              AND COMPOUND OSCILLATING OUTER SHEAR PLATE
Filed Oct. 9, 1961                                    3 Sheets-Sheet 3
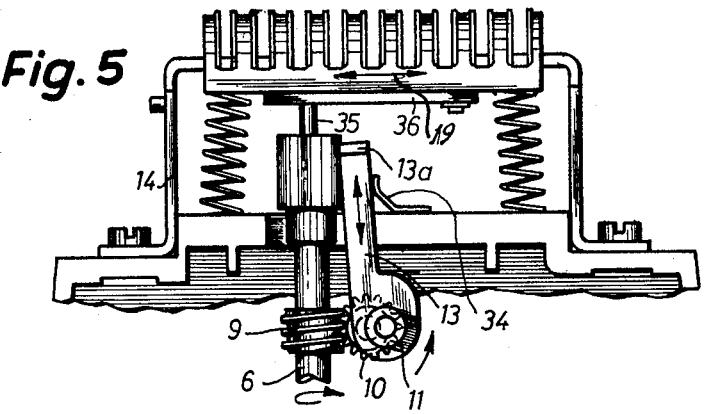
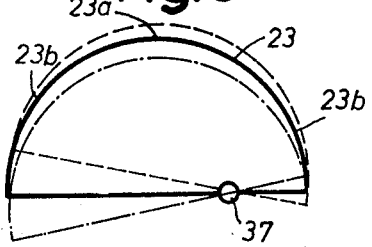
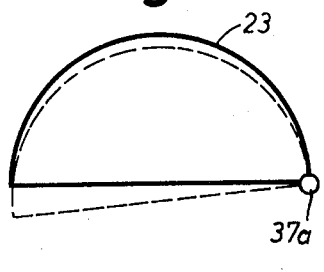
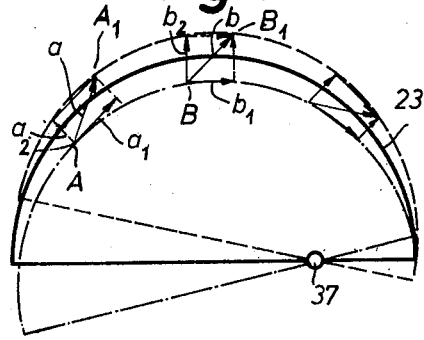
JOHAN GODEFROY
    INVENTOR.
BY Semmes & Semmes

United States Patent Office 3,156,045
Patented Nov. 10, 1964

3,156,045
DRY SHAVER WITH RECIPROCATING INNER CUTTER AND COMPOUND OSCILLATING OUTER SHEAR PLATE
Johan Godefroy, Mauricialaan 40, Overveen, Netherlands
Filed Oct. 9, 1961, Ser. No. 150,610
3 Claims. (Cl. 30—43.3)

The invention disclosed herein relates to dry shavers and in particular to an improved dry shaver having cutting knives arranged to reciprocate in relation to an oscillating cutting plate.

Dry shavers of the type wherein cutting knives move along a straight axis around which a cutting plate rocks are old in the art. German Auslegeschrift 1,094,151, for example, discloses a cutting plate and knives that are reciprocated at different speeds by an armature shaft or block.

U.S. Patent No. 2,555,621 discloses a dry shaver having cutting knives which are reciprocated within a partly cylindrical cutting plate which is fixed to a frame by flexible side pieces, the frame being pivoted during use by an eccentric.

Further, the use of reciprocating cutting knives and a cutting plate that are moved up and down in a direction normal to the skin is shown by U.S. Patent 2,260,114.

Finally, U.S. Patent 2,830,365 discloses a hand-powered dry shaver having a cutting plate enclosing a cutting head and which is designed to rock about an eccentric axis.

In the improved dry shaver disclosed herein, provision is made for reciprocating the cutting knives and the cutting plate while simultaneously moving the cutting plate up and down in an oscillating fashion. Thus there are three distinct movements achieved by the novel shaver disclosed herein; namely, the reciprocation of the knives; the pivotal oscillation of the cutting plate; and the up and down movement of the cutting plate caused by its oscillation. While the reciprocating movement of the knives in relation to the cutting plate is responsible for the cutting or shearing effect, the oscillating movement of the cutting plate enables the individual beard hairs to be grasped, and the up and down movement of the cutting plate resulting from its oscillation causes a buffeting of the skin, which, when operating in conjunction with the pivotal oscillation of the cutting plate causes the hairs immediately adjacent the skin to be grasped.

The above simultaneous movements are superimposed in such a manner that the up and down movement of the cutting plate takes place at the same frequency as its pivotal reciprocation while the reciprocation frequency of the knives is 5 to 15 times greater. The above-mentioned up and down movement of the cutting plate and its pivotal reciprocation is accomplished by a single combined movement resulting from pivoting the cutting plate about a single axis that is eccentric with respect to the axis of reciprocation of the cutting knives. The eccentric axis of the cutting plate may lie either along the arc of the cutting plate or within the cutting plate.

In the dry shaver construction disclosed herein, the up and down movement of the cutting plate as well as its pivotal reciprocation is accomplished with the use of an eccentric lever connected to an edge of the cutting plate along its longitudinal, eccentric axis. Since the cutting knives of the cutting head engage the cutting plate from the inside thereof, and the cutting head takes up the play allowed for movement, the cutting head is thus resiliently pressed against the cutting plate with a lateral clearance in the guide or bearings.

Accordingly, it is an object of the present invention to increase the efficiency of dry shavers with the use of a cutting head having knives which reciprocate longitudinally with respect to the cutting head and a cutting plate which oscillates at a different frequency from that of the reciprocating knives about an axis parallel to but spaced from the axis of movement of the cutting knives.

Yet additional objects of invention will become apparent from the ensuing specification and the attached drawings which illustrate the improved dry shaver wherein:

FIGURE 1 is a sectional view partly opened showing the entire dry shaver.

FIGURE 2 is a top view showing the cutting plate and its frame.

FIGURES 2a and 2b are end views showing the cutting plate and its frame.

FIGURE 5 is an elevation showing the cutting plate and the eccentric lever associated therewith.

FIGURES 6 through 8 are schematic diagrams showing one oscillatory movement of the cutting plate.

Figure 3:
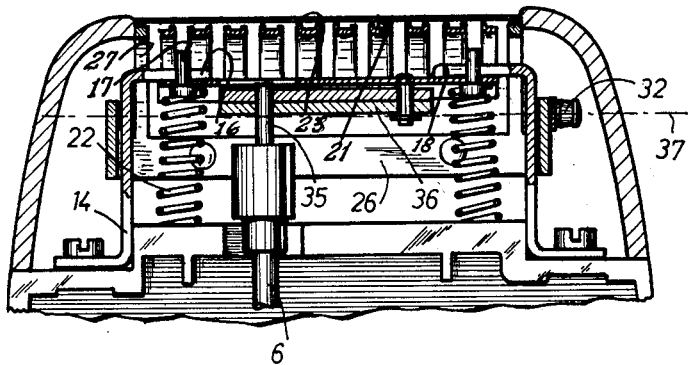
FIGURE 3 is a sectional view showing the cutting head and its drive assembly.
Figure 3A:
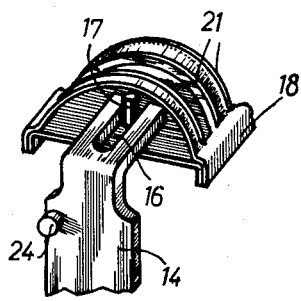
FIGURES 3a and 3b are perspective views showing the cutting head and its drive assembly.
Figure 3B:
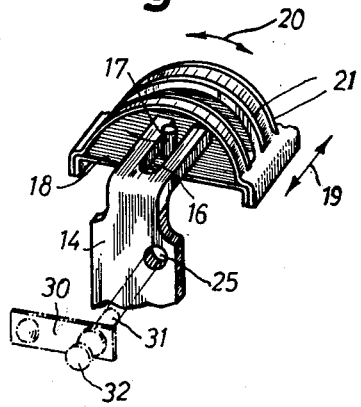

As seen in FIGURE 1, the electrical connecting pins 2 are mounted within housing 1 of the dry shaver and joined to leads 3 of the drive motor which comprises a magnet or stator 4 and rotor or armature 5. One end of shaft 6 of armature 5 is journalled within frame member 7 while the other end thereof is journalled within frame member 8. Shaft 6 also has worm 9 resting in engageable relationship with worm wheel 10. An eccentrically mounted roller or pin 11, having a lever 13 journalled on one end thereof, is attached to the front worm wheel 10 or on a separate wheel keyed on shaft 12 carrying the worm wheel. Supports 14 are attached to housing 1 near edges 1a thereof and have horizontally bent portions containing elongated slots 16 as shown in FIGURES 3a and 3b. In slots 16 are located pins 17 of cutting head 18 which slide in the direction of double arrow 19 (FIGURE 4) and also have sufficient play laterally to allow a pivotal movement in longitudinal or elongated slot 16 when knives 21 are moved pivotally in the direction of double arrow 20 (FIGURE 3b).

Knives 21 of cutting head 18 are held against cutting plate 23 in such a manner as to allow them to follow the up and down movement of cutting plate 23 and to rest against the inner or lower side of cutting plate 23.

One of the supports 14 carries a pin 24 (FIGURE 3a) while the other support has opening 25 (FIGURE 3b) for enclosing pin 31. As seen in FIGURE 1, cutting plate 23 is supported by horizontal, rectangular frame 26 which supports brackets 27 on which the ends 23a of cutting plate 23 lie. Cutting plate 23, which is provided with elongated holes, is riveted or screwed on frame 26 with a small clearance 28 between the ends 23a of cutting plate 23 and brackets 27, as shown in FIGURE 2b.

As seen in FIGURES 2, 2a and 2b, frame 26 of cutting plate 23 has an opening 29 into which pin 24 of one support projects. A pin 31, mounted on leaf spring 30 and having an extension in the form of a handle 32, passes into hole 25 of the second support 14. Pins 24, 31 and holes 25, 29 lie on axis 37 which is spaced from axis 33 of cutting head 18 which defines the path of reciprocation of cutting knives 21.

As seen in FIGURES 1 and 5, eccentric lever 13, which engages the frame 26 of cutting plate 23, has a bent portion or projection 13a lying in a slot or recess 26a in frame 26. A strip spring 34 insures that eccentric lever 13 remains engaged or in contact with frame 26 while permitting pivoting of lever 13 for removal of cutting plate 23. When removing cutting plate 23 it is only necessary for pin 31 to be swung out of hole 25 and pin 24 to be withdrawn from hole 29 thus allowing frame 26 to be taken off.

Figure 4:
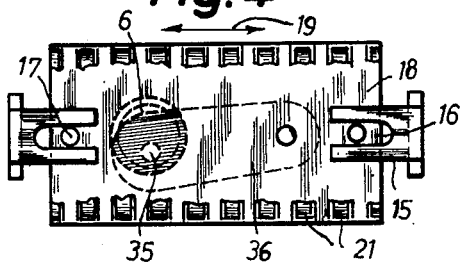
FIGURE 4 is a top view showing the cutting head.

In operation, cutting head 18 with knives 21 is driven through a rod or pitman 36 by eccentric 35 and reciprocates in the direction of double arrow 19 (FIGURE 4). Simultaneously, cutting plate 23 is oscillated by eccentric lever 13 about axis 37 which, as mentioned above, is determined by pins 24, 31 and their respective holes 28, 29 (FIGURE 2). The relationship of the frequency of reciprocation of cutting knives 21 to the frequency of oscillation of cutting plate 23 is determined by the design of worm 9 and worm wheel 10. That is, once a particular frequency of reciprocation of knives 21 is established by the particular location of eccentric 35, the frequency of oscillation of plate 23 is set at $\frac{1}{5}$ to $\frac{1}{15}$ of that of the knives 21 by merely selecting the proper worm 9 and worm wheel 10 in accordance with standard procedures applicable to the design of such worm gears.

The various movements of cutting plate 23 are illustrated in FIGURES 6 and 7. FIGURE 6 shows an advantageous position of axis 37 wherein the greatest amplitude of oscillation is at the top or apex 23a of cutting plate 23. That is, this location of axis 37 allows the top part of cutting plate 23 to achieve the maximum up and down movement at apex 23a when a strong buffeting action is required during shaving. A weaker up and down movement and a more pronounced pivotal movement, if required, is achieved at position 23b.

A second movement of cutting plate 23 is shown in FIGURE 7 and is achieved by locating the axis of oscillation of cutting plate 23 at one end thereof as shown by reference numeral 37a.

As shown in FIGURE 8, individual points on the face of cutting plate 23 perform combined or complex movements. Thus, as point A on cutting plate 23 moves to position $A_1$, it travels along path $a$ which is the resultant of components $a_1$ and $a_2$ wherein $a_1$ is greater than $a_2$. Likewise, when point B on the face of cutting plate 23 moves to point $B_1$, it travels along path $b$ which comprises components $b_1$ and $b_2$ of equal magnitude. That is, the pivotal oscillatory movement $b_1$ is equal to the up and down movement $b_2$.

Manifestly, still further modification of the novel dry shaver may be employed without departing from the scope of invention, as defined by the subjoined claims.

What I claim is:

1. In an electric shaver, a shaverhead assembly including:
   (A) a plurality of knives;
   (B) means for causing said knives to reciprocate along a first longitudinal axis;
   (C) a cutting plate with means for mounting said plate above said knives;
   (D) means for oscillating said cutting plate about a second longitudinal axis that is off-set from said first longitudinal axis; and
   (E) means for causing said cutting plate to oscillate and said knives to reciprocate at different frequencies.

2. An electric shaver comprising:
   (A) a base having a top portion;
   (B) a pair of vertical supports attached to said top portion of said base;
   (C) a plurality of knives mounted upon said supports along a first axis that is parallel with respect to said top portion of said base;
   (D) means for causing said knives to reciprocate along said first axis;
   (E) a cutting plate mounted upon said supports along a second axis that is parallel with respect to said top portion of said base and off-set from said first axis;
   (F) means for causing said cutting plate to oscillate about said second axis eccentrically with respect to said first axis; and
   (G) means for causing said cutting plate to oscillate and said knives to reciprocate at different frequencies.

3. An electric shaver as in claim 2 in which said cutting plate is mounted upon each of said supports at points below said first axis and at a distance to the side of said first axis, said points defining said second axis.

References Cited by the Examiner

UNITED STATES PATENTS

| | | | |
|---|---|---|---|
| 2,260,114 | 10/41 | Hammond | 30—43.8 |
| 2,263,747 | 11/41 | Stein | 30—43.1 |
| 2,277,328 | 3/42 | Kamholz | 30—43.6 |
| 2,283,834 | 5/42 | Van Dam et al. | 30—43.6 |
| 2,308,920 | 1/43 | Horowitz et al. | 30—43.6 |
| 2,339,677 | 1/44 | Burns | 30—43.2 |
| 2,347,869 | 5/44 | Amdur | 30—43.2 |
| 2,830,364 | 4/58 | Barnard | 30—43.2 |
| 2,873,520 | 2/59 | Schnapp et al. | 30—43 X |
| 2,920,387 | 1/60 | Marescalchi | 30—43.2 |
| 2,965,966 | 12/60 | Jacobs | 30—43.6 |

WILLIAM FELDMAN, *Primary Examiner.*

EDWARD V. BENHAM, MYRON C. KRUSE,
*Examiners.*